United States Patent
Itagaki et al.

(10) Patent No.: US 9,086,809 B2
(45) Date of Patent: Jul. 21, 2015

(54) WRITING AND READING DATA HAVING MULTIPLE ACCESS PATTERNS ON TAPE MEDIA

(71) Applicant: International Business Machines Corporation, Armonk, NY (US)

(72) Inventors: Hiroshi Itagaki, Kanagawa-ken (JP);
Takashi Katagiri, Kanagawaken (JP);
Yohichi Miwa, Kanagawaken (JP);
Yumi Mori, Kanagawa-ken (JP);
Yoshikuni Murakami, Kanagawa (JP);
Izuru Narita, Kanagawa-ken (JP);
Yutaka Oishi, Kanagawa (JP);
Kazuhiro Tsuruta, Kanagawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/493,097

(22) Filed: Sep. 22, 2014

(65) Prior Publication Data
US 2015/0116858 A1    Apr. 30, 2015

(30) Foreign Application Priority Data
Oct. 29, 2013   (JP) .................................. 2013-224185

(51) Int. Cl.
| | |
|---|---|
| *G11B 5/09* | (2006.01) |
| *G11B 5/584* | (2006.01) |
| *G06F 3/06* | (2006.01) |
| *G11B 5/008* | (2006.01) |

(52) U.S. Cl.
CPC ............ *G06F 3/0613* (2013.01); *G06F 3/0643* (2013.01); *G06F 3/0682* (2013.01); *G11B 5/00817* (2013.01)

(58) Field of Classification Search
CPC ........ G11B 5/74; G11B 5/70; G11B 2220/90; G11B 27/107; G11B 5/588; G11B 5/584; G06F 3/0601; G06F 3/0686; G06F 21/72; G06F 21/10
USPC .................... 360/48, 134, 77.12, 77.13, 72.2; 713/189; 711/111, 113; 707/823, 636, 707/630
See application file for complete search history.

(56) References Cited

U.S. PATENT DOCUMENTS 8,068,303 B2 * 11/2011 Jaquette .......................... 360/48

FOREIGN PATENT DOCUMENTS

JP    2013191259 A    9/2013

OTHER PUBLICATIONS

Appendix P, Nov. 7, 2014.

* cited by examiner

*Primary Examiner* — Nabil Hindi
(74) *Attorney, Agent, or Firm* — Garg Law Firm, PLLC; Rakesh Garg; Damion Josephs (57) ABSTRACT

Data is recorded such that the positions of data will be aligned in a traveling direction and a width direction of the storage medium. The medium travels in the traveling direction from a first to a second position as a certain wrap of a group of plural files in a first physical range between the first and the second positions. A head shifts from the certain wrap to another wrap in the width direction of the medium. The medium travels in the traveling direction from a third to a fourth position as the other wrap of a group of plural files in a second physical range between the third and the fourth positions. The plural files in groups on the certain wrap and the other wrap may be written in reverse order to each other after being once stored in a buffer.

10 Claims, 8 Drawing Sheets

WRITING AND READING DATA HAVING MULTIPLE ACCESS PATTERNS ON TAPE MEDIA

The present patent application is a DOMESTIC COUNTERPART of, and claims priority under PCT to, the foreign patent application No. 2013-224185 filed in Japan on Oct. 29, 2013.

TECHNICAL FIELD

The present invention relates to a method of writing and reading data having multiple access patterns on a tape medium.

BACKGROUND ART

IBM (IBM is a trademark of International Business Machines Corporation registered in many countries around the world) has a product called LTFS (Linear Tape File System) as a file system that runs on a tape device.

Some versions can be downloaded for free from a web site as software or a program cooperating with hardware, and other versions are sold.

LTFS is an open standard, and multiple companies are doing business with products adopting the LTFS standard.

Figure 1:
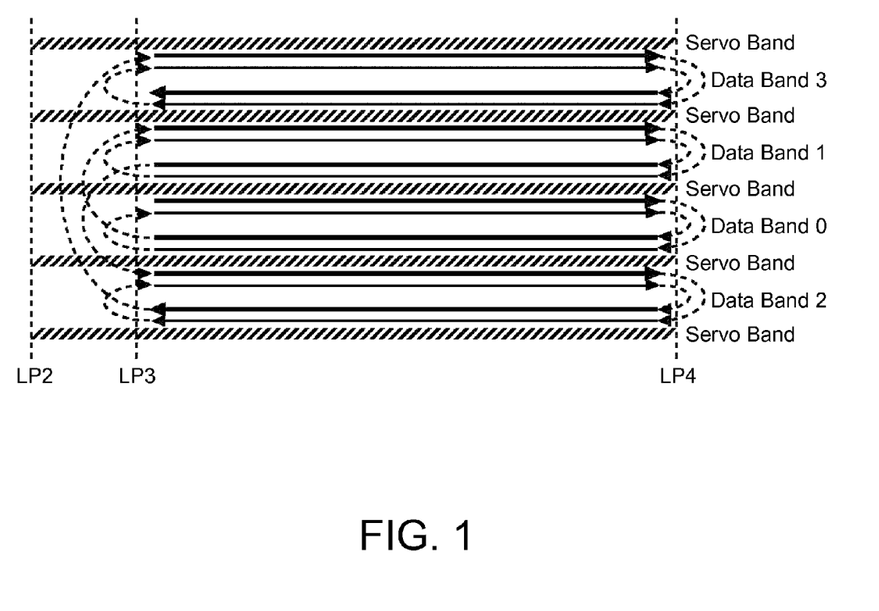
FIG. 1 is a schematic diagram of usages of data bands and wraps on a tape medium as a conventional technique.

FIG. 1 is a schematic diagram of usages of data bands and wraps on a tape medium adopting an LTO (Linear Tape-Open) as a conventional technique.

The tape medium adopting the LTO standard is divided into areas called four data bands as in FIG. 1.

When a tape drive writes data to the tape medium, the tape drive reciprocates a tape with a total length of a few hundred meters a few dozen times to write an amount of data corresponding to the prescribed capacity of the tape medium.

Although simplified in FIG. 1, the tape is actually reciprocated about ten times per data band (the number of reciprocations differs depending on the generation of the format).

This one way is called a "wrap."

All wraps are numbered. The wraps used to read and write data while traveling the tape medium in the forward direction have even numbers, and the wraps used to read and write data while traveling the tape medium in the backward direction have odd numbers.

When writing data and when reading written data serially, the tape medium can read and write data at a transfer rate of about 160 MB/sec.

On the other hand, when plural pieces of data existing in any positions are read, since the length of the tape medium is about 800 m, a seek time of one minute on average or about two minutes at most is required for the travel between pieces of data.

In other words, when discrete pieces of multiple data existing at any positions are read, the transfer rate is significantly reduced. It can be said that the cause is the seek time required.

The emergence of LTFS enables users of tape media to write and read files to and from the tape media directly via a file system without through dedicated backup software or a hierarchical storage system.

Therefore, more and more users who did not use tape media in the past have begun using the tape media.

In a hospital, various kinds of data that range from data of a small size, such as name, sex, and age in an electronic medical record or the like, to data of a large size, such as an X-ray image or video taken with an endoscope are used.

Although it has been conventionally common practice to manage such kinds of data in a hard disk drive (HDD), the introduction of LTFS to manage data is being considered because the threshold to use tape media through the LTFS has been lowered.

As the characteristics of data handled in a hospital, multiple methods of using data exist.

As an access pattern used in medical examination and treatment, there is a pattern of access to plural kinds of data (e.g., name, sex, age, an X-ray image, and endoscopic video) in units of patients.

On the other hand, as an access pattern for academic use, there is a pattern of access to specific data (e.g., X-ray images) across multiple patients.

When random access occurs in data reading, the transfer rate in data reading is significantly reduced irrespective of whether the storage destination of data is a tape medium or an HDD.

Thus, there is a reduction in reading transfer rate caused by random access that occurs when there are multiple access patterns for using data.

Patent Literature 1 is made by the same applicant as this application, and it is meaningful as a reference to understanding a writing method adopted as a prerequisite in the present invention.

Figure 6:
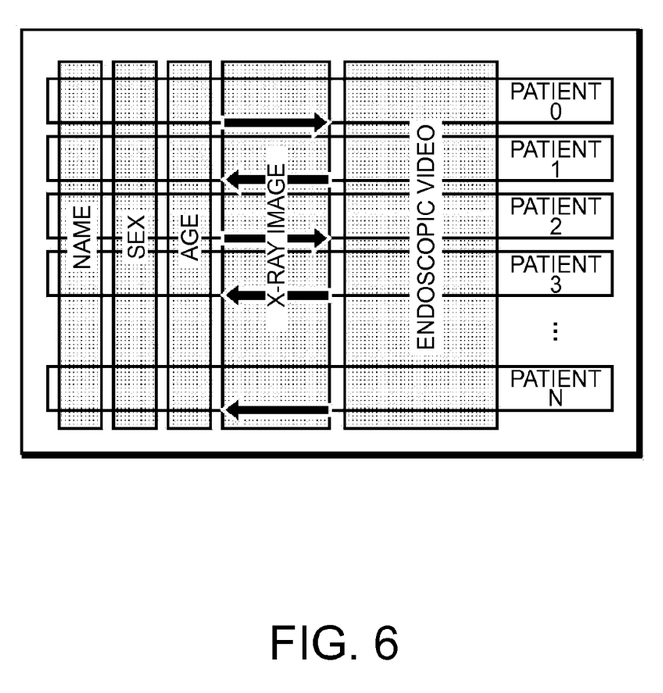
FIG. 6 is a diagram showing the movement of the tape medium as the present invention when all X-ray images recorded on the tape medium are read.

In Patent Literature 1, data are written by paying attention only to one rectangle (a singular file of each of name, sex, age, X-ray image, and endoscopic video) as shown in FIG. 6 of the present application (to be described in detail later) only to intend to read data vertically.

Figure 5:
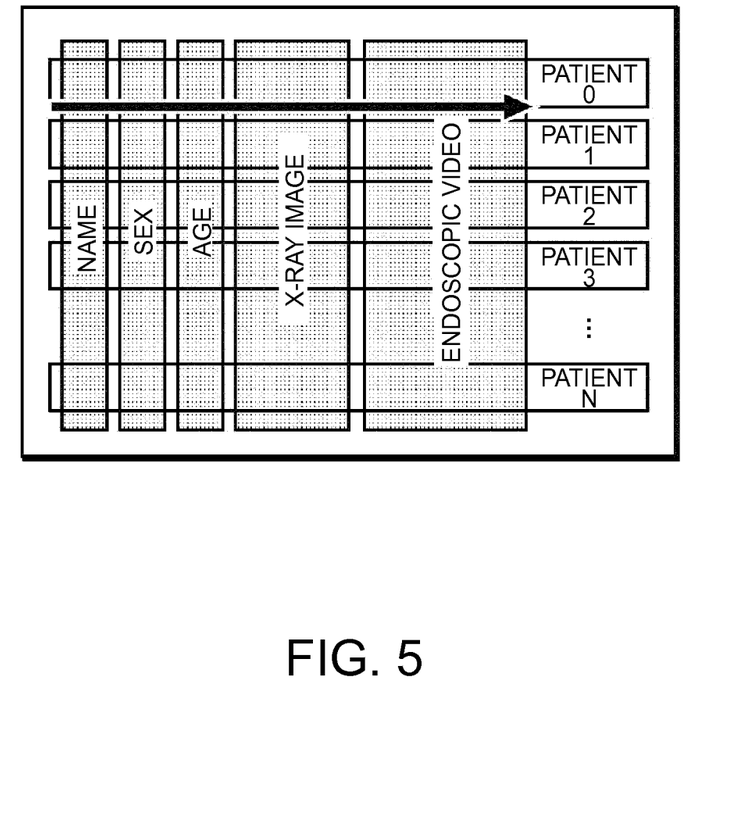
FIG. 5 is a diagram showing the movement of a tape medium as the present invention when data on patient 0 recorded on the tape medium are read.

To summarize a difference between (features of) Patent Literature 1 and the present invention, the present invention also considers a landscape-oriented rectangle as shown in FIG. 5 of the present application to write data to a tape medium in a manner to make it easy to read the data along both the landscape orientation (along the landscape-oriented rectangle) and the portrait orientation (along the portrait-oriented rectangle).

In other words, in the present invention, data are written by paying attention to two-dimensional arrangement on the assumption of use in multiple access patterns.

[Patent Literature 1] Japanese Patent Application Publication No. 2013-191259

SUMMARY OF INVENTION

The purpose of the present invention is to solve a problem of a reduction in reading transfer rate caused by random access that occurs when there are multiple methods of using data.

In the present invention, data to be recorded on a storage medium are so recorded that the positions of data will be aligned in a traveling direction of the storage medium (in a longitudinal direction in the case of a tape medium) and a width direction of the storage medium according to each of multiple data access patterns to reduce the required seek time at the time of data reading in order to improve the transfer rate in data reading.

According to the present invention, the required seek time is reduced at the time of data reading, and this can improve the transfer rate in data reading. Specific numeric values will be described later.

DETAILED DESCRIPTION

An embodiment of the present invention will be described with reference to the accompanying drawings.

Figure 2:
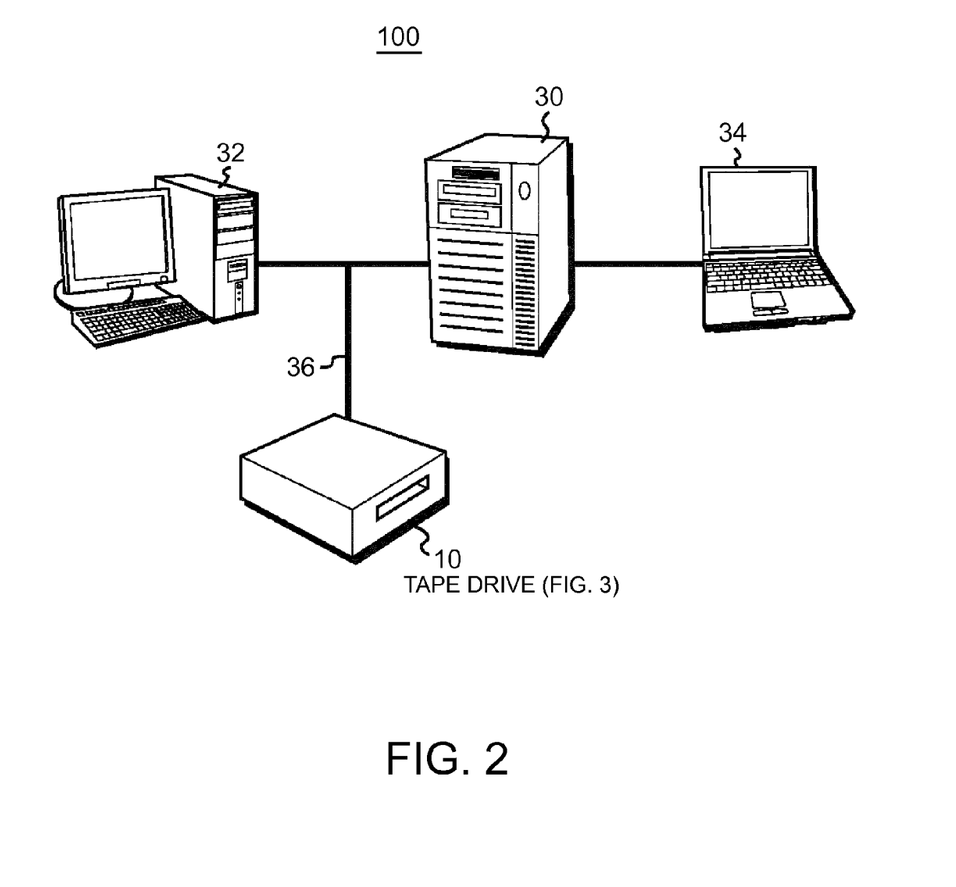
FIG. 2 is a diagram showing a configuration example of a file system related to the present invention.

FIG. 2 is a diagram showing a configuration example of a file system related to the present invention.

A file system 100 is made up of a tape drive 10, a host (server) 30, and PCs (terminals) 32 and 34, which are communicable with one another through a network 36.

Although the tape drive 10 and the host (server) 30 are each illustrated as one component in FIG. 2, this is just an example, and two or more tape drives 10 and hosts (servers) 30 can be included.

Further, though not shown, an external data source is connectable to the network 36 so that data can be sent to the tape drive 10 directly or through the server 30 and the PC 32, 34.

For example, the file system 100 can be an LTFS (Linear Tape File System).

Like an HDD, a USB memory, or any other removable recording medium such as a CD-R, the LTFS provides a mechanism that enables direct access to a file stored in a tape cartridge when the tape cartridge is inserted into the tape drive.

In order to build a file system on a tape medium, the tape drive needs to have a partition feature.

In LTO standards after LTO-5, a tape is divided into two partitions.

Figure 3:
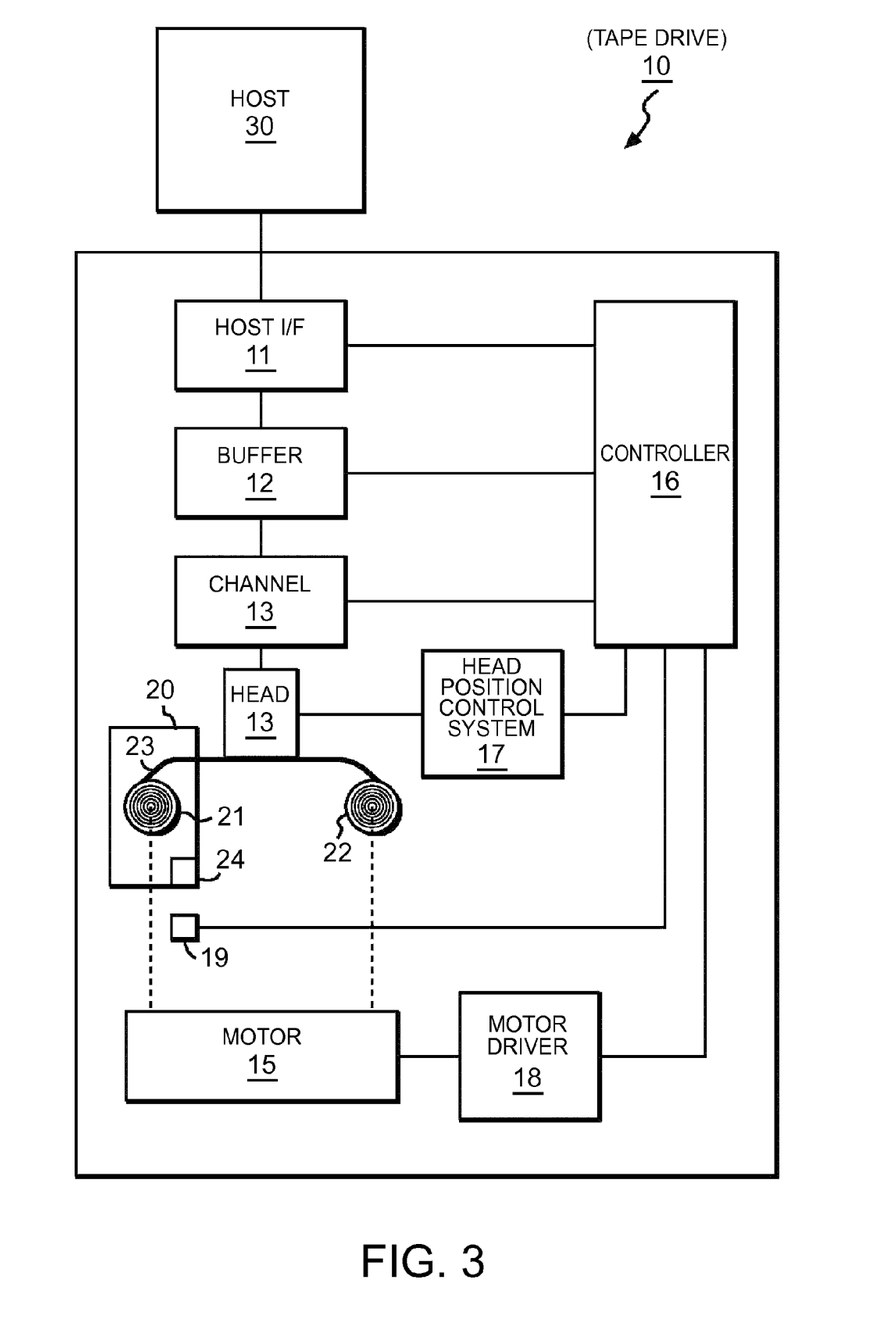
FIG. 3 is a diagram showing a configuration example of a tape drive related to the present invention.

FIG. 3 is a diagram showing a configuration example of the tape drive related to the present invention.

The tape drive 10 includes a host interface (hereinafter called "host I/F") 11, a buffer 12, a channel 13, a head 14, and a motor 15.

The tape drive 10 also includes a controller 16, a head position control system 17, and a motor driver 18.

Since a tape cartridge 20 is loadable when the tape cartridge 20 is inserted into the tape drive 10, the tape cartridge 20 is further shown here.

This tape cartridge 20 includes a tape 23 wound on reels 21 and 22.

The tape 23 moves in a longitudinal direction with the rotation of the reels 21 and 22 from the reel 21 to the reel 22 (forward direction) or from the reel 22 to the reel 21 (backward direction).

A magnetic tape is exemplified as the tape 23, but the tape 23 may be any storage medium (e.g., HDD) other than the magnetic tape.

The tape cartridge 20 also includes a cartridge memory (CM) 24. This CM 24 records, for example, information about how data was written on the tape 23.

Then, for example, an index of data written on the tape 23 in a noncontact mode using an RF interface or the usage of the tape 23 is checked to enable high-speed access to the data.

In FIG. 3, an interface like this RF interface for performing access to the CM 24 is shown as a cartridge memory interface (hereinafter, referred to as "CM I/F") 19.

Here, the host I/F 11 performs communication with the host (server) 30 or the other PC 32.

For example, the host I/F 11 receives, from an OS of the host 30, a command to instruct writing of data to the tape 23, a command to move the tape 23 to a target position, and a command to instruct reading of data from the tape 23.

In the example of the LTFS mentioned above, data within the tape drive can be referred directly from a desktop OS or the like, and a file can be executed by the double click or copied by the drag-and-drop action like a case of handling a file within an HDD.

The buffer 12 is a memory for accumulating data to be written to the tape 23 and data read from the tape 23.

For example, the buffer 12 is a DRAM.

The buffer 12 is composed of multiple buffer segments, and each buffer segment stores a data set as a unit of read/write from/to the tape 23.

Data sent from the external data source through the network 36 in FIG. 2 are accumulated sequentially in the buffer 12.

The channel 13 is a communication channel used to send the head 14 data to be written to the tape 23 and receive, from the head 14, data read from the tape 23.

The head 14 writes information to the tape 23 and reads information from the tape 23 when the tape 23 reciprocates in the longitudinal direction.

The motor 15 drives the reels 21 and 22 to rotate.

Note that although the motor 15 is indicated by one rectangle in FIG. 3, it is preferred to provide, as the motor 15, a total of two motors, one for each of the reels 21 and 22.

The controller 16 controls the entire tape drive 10. For example, the controller 16 controls writing to the tape 23 and reading from the tape 23 according to the commands accepted at the host I/F 11.

The controller 16 also controls the head position control system 17 and the motor driver 18.

The head position control system 17 is a system for keeping track of a desired wrap.

The wrap is a group of multiple tracks on the tape 23 that the head 14 can read and write at a time.

Although the number of wraps depends on the format of the tape 23, it is typically about several dozens.

The length (given length) of a wrap can be set by the controller 16.

When it is necessary to switch (move) from one wrap to another, the head 14 also needs to be electrically switched. Such switching is controlled by this head position control system 17.

The head is shifted from a certain wrap to another wrap.

The motor driver 18 drives the motor 15.

As mentioned above, if two motors 15 are used, two motor drivers 18 will also be provided.

The CM I/F 19 is, for example, implemented by an RF reader/writer to write information to the CM 24 and read information from the CM 24.

The present invention will be described below by taking, as an example, a case where electronic medical records handled in a hospital are stored on a tape medium.

Figure 4:
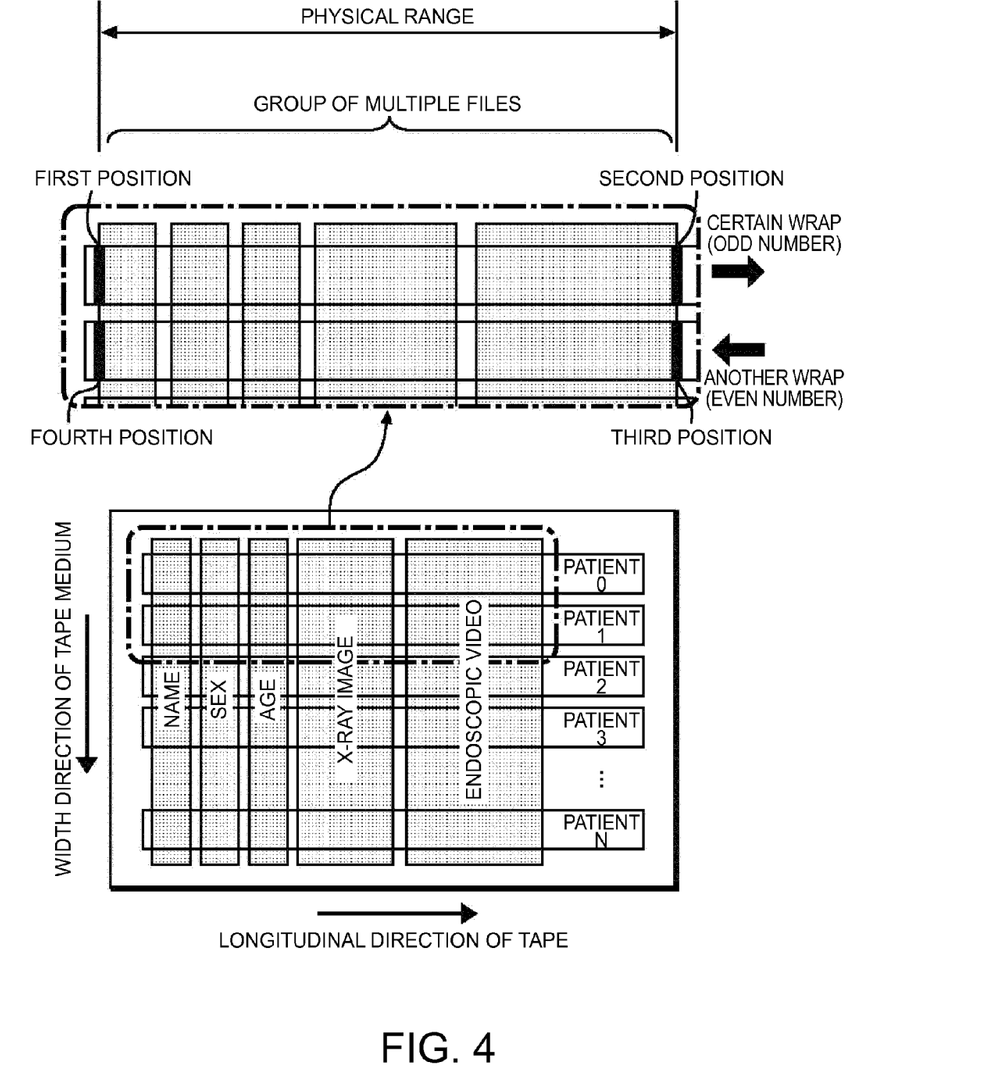
FIG. 4 is a diagram showing a method of recording data having multiple access patterns as the present invention.

FIG. 4 is a diagram showing a method of recording data having multiple access patterns as the present invention.

In the present invention, when information on electronic medical records is recorded on a tape medium, the information is so recorded that data for each patient will be aligned laterally and data for each kind will be aligned longitudinally as shown in FIG. 4.

Specifically, a physical range of groups of multiple files stored across multiple wraps divided in the width direction of a storage medium (the lateral direction of a tape medium or the radial direction of an HDD) is recorded to align in the traveling direction of the storage medium (the longitudinal direction of the tape medium or the rotational direction of the HDD).

In a specific procedure, the storage medium is traveled in the traveling direction (longitudinal direction) from a first position to a second position of the storage medium as a certain wrap.

During this travel, a group of multiple files is written or the group of multiple files is read in a first physical range between the first position and the second position.

Next, the head is shifted from the certain wrap to another wrap in the width direction of the storage medium.

The storage medium is traveled in the traveling direction (longitudinal direction) from a third position to a fourth position of the storage medium as the other wrap.

During this travel, a group of multiple files is written or the group of multiple files is read in a second physical range between the third position and the fourth position.

Here, when the traveling direction (longitudinal direction) of the storage medium on the certain wrap and the traveling direction (longitudinal direction) of the storage medium on the other wrap are opposite to each other, writing to a wrap in the opposite direction can be done in such a manner that, after the group of multiple files in the forward direction is once stored in the buffer, these multiple files are written in reverse order.

Further, the first physical range and the second physical range, and further the respective positions of the multiple files in these ranges are substantially aligned in the traveling direction (longitudinal direction) of the storage medium.

It is a further feature that the group of multiple files on the certain wrap and the group of multiple files on the other wrap are provided in a manner to be distinguishable as access patterns (along the landscape orientation) on a wrap-to-wrap basis.

Here, the attribute of each of the multiple files stored in the first physical range is substantially the same as the attribute of each of the multiple files stored in the second physical range.

Specifically, as information on electronic medical records in a hospital, the attribute of each of the multiple files is name, sex, age, X-ray image, or endoscopic video.

In practice, all the attributes are not necessarily required as data handled in the hospital, but at least one of them will be included.

Further, the group of multiple files on the certain wrap and the group of multiple files on the other wrap are provided in a manner to be distinguished from each other data by data on personal information (e.g., for each patient).

Such a distinction is effective in terms of protecting personal information.

The certain wrap and the other wrap are reciprocated across patient 0 to patient N, and repeated alternately in the width direction of the storage medium.

As shown, the certain wrap is set as an odd-numbered or even-numbered wrap as an outward path, and the other wrap is set as an even-numbered or odd-numbered wrap as a return path.

In order to match the data size per patient to the data capacity per wrap of the tape medium, the tape medium may be scaled (i.e., logically shortened to reduce the capacity), or conversely, the write starting positions of respective data may be aligned by adding dummy data onto the tape medium at the time of writing without being scaled.

Thus, it is necessary to grasp the size of each data beforehand in order to perform recording, but this limitation is not a problem in such a situation that data are archived on a tape medium.

Applications using tape media including LTFS can use a SCSI command called Request Sense to grasp to which portion on a tape medium the write end position of data corresponds.

When the capacities are not matched to each other, or when the recording end position of each data is shifted by the compression function of a tape drive, dummy data can be written to align the write starting positions of respective data.

In other words, as a specific option, the storage medium may be scaled (i.e., logically shortened to reduce the capacity) to adjust the sizes of groups of multiple files stored across multiple wraps in order to align the first position to the fourth position.

As another specific option, dummy data may be added at the time of writing groups of multiple files to adjust the sizes of groups of multiple files stored across multiple wraps in order to align the first position or the third position.

FIG. 5 is a diagram showing the movement of the tape medium as the present invention when data on patient 0 recorded on the tape medium are read.

The data is thus recorded. In this case, for example, when data on a patient are read for the purpose of medical examination and treatment, data are sequentially read as shown in FIG. 5 as one of access patterns to enable high-speed reading of the data.

FIG. 6 is a diagram showing the movement of the tape medium as the present invention when all X-ray images recorded on the tape medium are read.

When specific data are read for the purpose of academic use, data are read as shown in FIG. 6 as another access pattern to enable high-speed reading of the data.

For example, when it is desired to read videos of a certain age group, the ages of all patients are first read by the method shown in FIG. 6, and corresponding videos are then read. This can significantly reduce the required seek time that is the main factor of a reduction in transfer rate at the time of reading.

Figure 7:
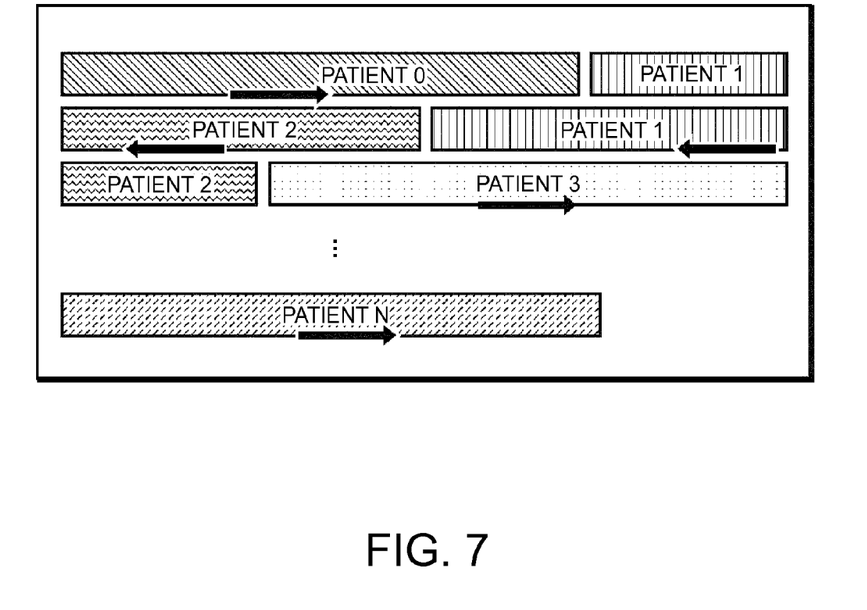
FIG. 7 is a diagram showing a conventional technique when partial information on each patient is read from written data using a conventional method.

FIG. 7 is a diagram showing a conventional technique when partial information on each patient is read from written data using a conventional method.

When data are recorded using the conventional method without being aligned in the longitudinal direction, there will be a need to perform seek over an entire range of the tape and to move between arrows even if portions to be actually read are only the portions indicated by the arrows in FIG. 7 in order to read X-ray images of all patients.

Therefore, if the wrap length is 800 m, the tape travel speed is 10 m/sec, and the number of wraps is 100, the time required for reading will be two hours or more (800 [m]/10 [m/sec]*100/60 [sec]/60 [min]=2.22 . . . ).

On the other hand, assuming that the size of an X-ray image per patient is 1 GB and the transfer rate is 250 MB/sec, the required seek time when data are aligned in the longitudinal direction is about 2 seconds at most.

Thus, it can be said that X-ray images of all the patients can be read in about 10 minutes by the application of the present invention ((1000 [MB]/250 [MB/sec]+2 [sec])*100/60 [sec]=10).

Figure 8:
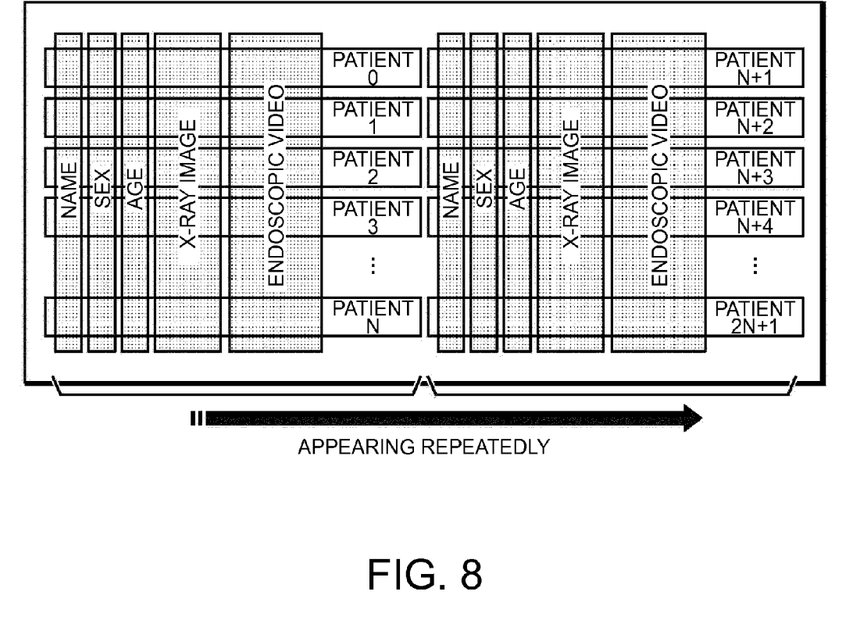
FIG. 8 is a diagram showing a recording method when multiple pieces of patient information are recorded in the lateral direction.

FIG. 8 is a diagram showing a recording method when multiple pieces of patient information are recorded in the lateral direction.

When the data size per patient is smaller than the capacity of the tape medium, information on multiple patients can, of course, be arranged in the lateral direction as shown in FIG. 8.

Specifically, a section corresponding to the first physical range and a section corresponding to the second physical range appear repeatedly even in different positions in the traveling direction (longitudinal direction) of the storage medium.

While the application of the present invention to a tape medium as a kind of storage medium has been described, the present invention is not limited thereto.

Further, it goes without saying that those skilled in the art can adapt the present invention to various directions of storage media accordingly, such as the rotational direction or the radial direction of a disk (an example of a storage medium) to be rotated in an HDD, and the seek direction of a head. The term "storage medium" does not encompass a signal propagation medium, any description in this disclosure to the contrary notwithstanding.

The invention claimed is:

1. An apparatus for storing files, the apparatus comprising:
a storage medium on which physical ranges of groups of plural files stored across a plurality of wraps divided in a width direction of the storage medium are aligned in a traveling direction of the storage medium, wherein the travelling direction of the storage medium is a longitudinal direction of the storage medium, and wherein the width direction of the storage medium is a lateral direction of the storage medium, wherein
as a result of traveling the storage medium in the traveling direction from a first position to a second position of the storage medium as a certain wrap, a group of plural files is written in a first physical range between the first position and the second position,
as a result of traveling the storage medium in the traveling direction from a third position to a fourth position of the storage medium as another wrap, a group of plural files is written in a second physical range between the third position and the fourth position,
the first physical range and the second physical range, and further relative positions of plural files in these ranges are substantially aligned in the traveling direction of the storage medium,
an attribute of each of plural files stored in the first physical range is substantially identical to an attribute of each of plural files stored in the second physical range, and
the group of plural files on the certain wrap and the group of plural files on the other wrap are provided in a manner to be distinguishable from each other.

2. The apparatus according to claim 1, wherein a section corresponding to the first physical range and a section corresponding to the second physical range appear repeatedly even in different positions in the traveling direction of the storage medium.

3. The apparatus according to claim 1, wherein storage of a group of plural files as the certain wrap and storage of a group of plural files as the other wrap are reciprocated with substantially identical attributes of groups of plural files, and repeated alternately in the width direction of the storage medium.

4. The apparatus according to claim 3, wherein the certain wrap is an odd-numbered or even-numbered wrap as an outward path, and the other wrap is an even-numbered or odd-numbered wrap as a return path.

5. The apparatus according to claim 1, wherein the storage medium is scaled for the groups of plural files stored across the plurality of wraps to align the first position to the fourth position, wherein when the storage medium is scaled the storage medium is logically shortened to reduce a capacity.

6. The apparatus according to claim 1, wherein dummy data is added when the groups of plural files stored across the plurality of wraps are written to align the first position or the third position.

7. The apparatus according to claim 1, wherein
the storage medium is a tape medium,
the traveling direction of the storage medium on the certain wrap and the traveling direction of the storage medium on the other wrap are opposite to each other, and
an order in the group of plural files on the certain wrap and an order in the group of plural files on the other wrap are as a result of being written in reverse order to each other.

8. A system for aligning, in a traveling direction of a storage medium, physical ranges of groups of plural files stored across a plurality of wraps divided in a width direction of the storage medium, the system comprising:
a first component to travel the storage medium in the traveling direction from a first position to a second position of the storage medium as a certain wrap to write a group of plural files or read the group of plural files in a first physical range between the first position and the second position, wherein the travelling direction of the storage medium is a longitudinal direction of the storage medium, and wherein the width direction of the storage medium is a lateral direction of the storage medium;
a second component to shift a head from the certain wrap to another wrap in the width direction of the storage medium;
a third component to travel the storage medium in the traveling direction from a third position to a fourth position of the storage medium as the other wrap to write a group of plural files or read the group of plural files in a second physical range between the third position and the fourth position;
a fourth component to align the first physical range and the second physical range, and further relative positions of plural files in these ranges substantially in the traveling direction of the storage medium, wherein an attribute of each of plural files stored in the first physical range is substantially identical to an attribute of each of plural files stored in the second physical range; and
a fifth component to provide the group of plural files on the certain wrap and the group of plural files on the other wrap in a manner to be distinguishable from each other.

9. The system according to claim 8, wherein
the storage medium comprises a tape medium,
the tape medium is loaded in an Linear Tape File System (LTFS) that runs on a tape device,
the traveling direction of the storage medium on the certain wrap and the traveling direction of the storage medium on the other wrap are opposite to each other, and
the system is operable to do writing to a warp in a backward direction in such a manner that, after a group of plural files in a forward direction is once stored, these plural files are written in reverse order.

10. A computer readable article of manufacture tangibly embodying a computer readable instructions which, when executed, cause a computer to carry out steps of a method for aligning, in a traveling direction of a storage medium, physical ranges of groups of plural files stored across a plurality of wraps divided in a width direction of the storage medium, the method comprising:

traveling the storage medium in the traveling direction from a first position to a second position of the storage medium as a certain wrap to write a group of plural files or read the group of plural files in a first physical range between the first position and the second position, wherein the travelling direction of the storage medium is a longitudinal direction of the storage medium, and wherein the width direction of the storage medium is a lateral direction of the storage medium;

shifting a head from the certain wrap to another wrap in the width direction of the storage medium;

traveling the storage medium in the traveling direction from a third position to a fourth position of the storage medium as the other wrap to write a group of plural files or read the group of plural files in a second physical range between the third position and the fourth position;

aligning the first physical range and the second physical range, and further relative positions of plural files in these ranges substantially in the traveling direction of the storage medium, wherein an attribute of each of plural files stored in the first physical range is substantially identical to an attribute of each of plural files stored in the second physical range; and providing the group of plural files on the certain wrap and the group of plural files on the other wrap in a manner to be distinguishable from each other.

* * * * *